Oct. 22, 1940.   J. C. McCUNE ET AL   2,218,616
BRAKE MEANS
Filed June 30, 1939   2 Sheets-Sheet 1
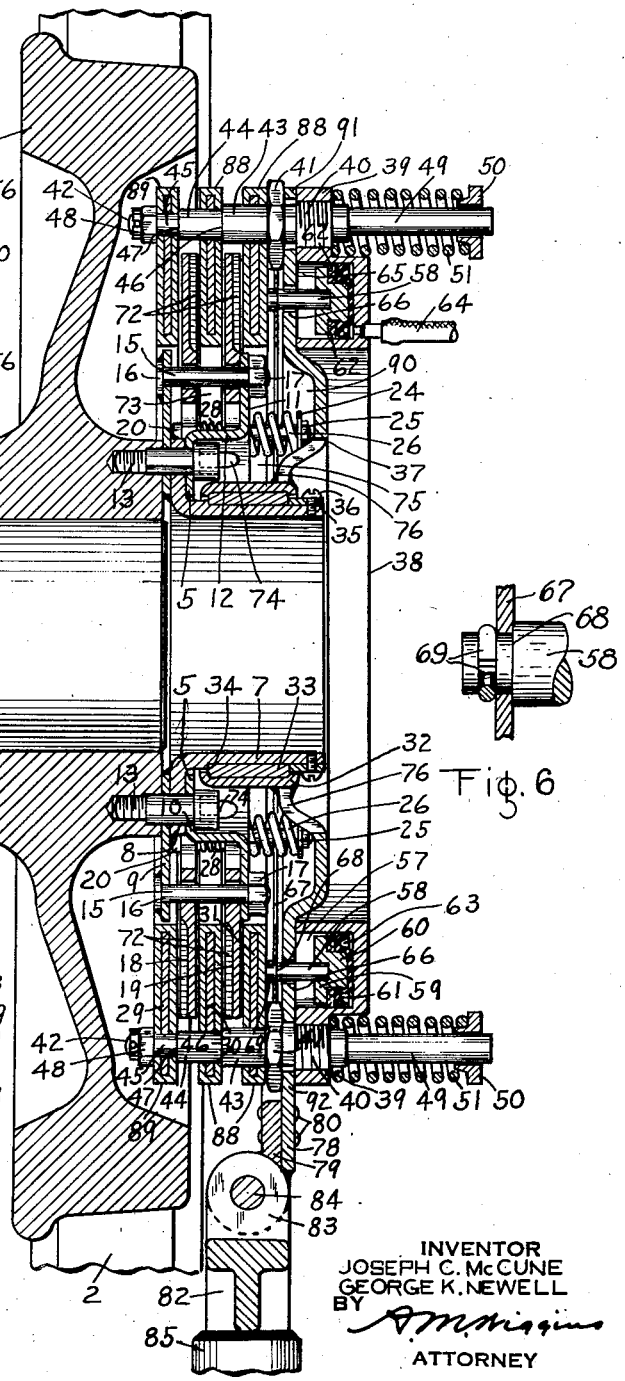
INVENTOR
JOSEPH C. McCUNE
GEORGE K. NEWELL
BY
ATTORNEY

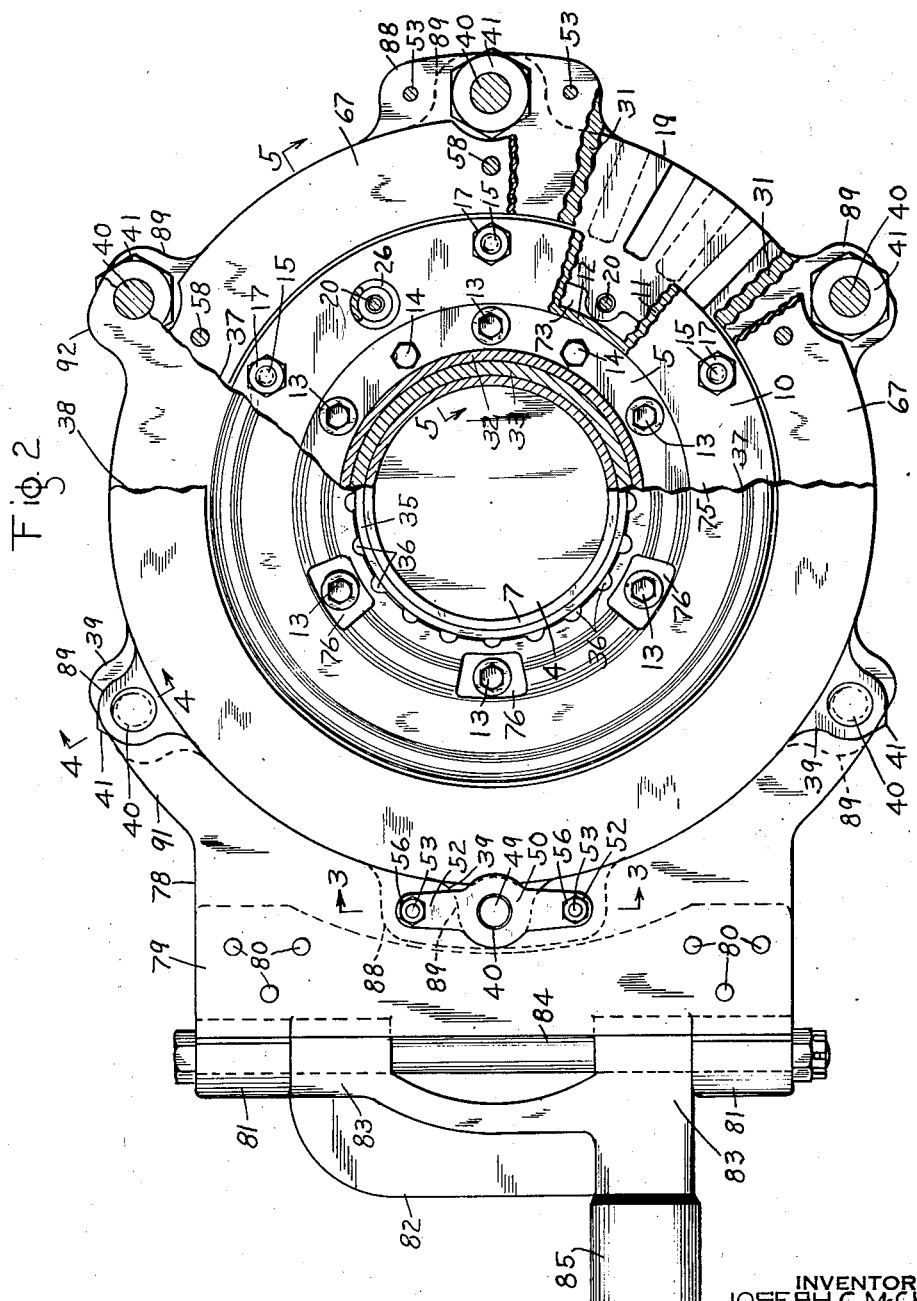

Patented Oct. 22, 1940

2,218,616

UNITED STATES PATENT OFFICE 2,218,616

BRAKE MEANS

Joseph C. McCune, Edgewood, and George K. Newell, near Pitcairn, Pa., assignors to The Westinghouse Air Brake Company, Wilmerding, Pa., a corporation of Pennsylvania Application June 30, 1939, Serial No. 282,034

15 Claims. (Cl. 188—153)

This invention relates to brake mechanisms and more particularly to the disk type for use on vehicles such as employed on railroads.

In our pending application Serial No. 253,771, filed January 31, 1939, there is disclosed a disk brake mechanism particularly adapted, though not limited, for use on railway vehicles and one of the main features of this mechanism is that it may be applied to and removed from a wheel to be braked as a unit. By this construction the brake mechanism may be completely assembled as a new or repaired unit in a shop remote from the point of use and where desired facilities for such work and competent workmen are readily available. Then as a preassembled unit the brake mechanism may, if desired, be shipped to and stored at a point of application on the railroad until it is desired to apply same to a vehicle, at which time such application may be readily effected by relatively unskilled workmen and with the simplest of tools.

One object of the present invention is to provide a novel disk brake mechanism of the unit type above described.

The disk brake mechanism disclosed in our above referred to pending application comprises a pile of interleaved, annular rotatable and non-rotatable friction brake elements and a brake cylinder device arranged at one end of the pile of brake elements and operative by fluid under pressure to urge said elements into frictional interengagement with each other to effect braking of the wheel to which the mechanism is secured. The brake elements and brake cylinder device are carried by a structure which is secured to the vehicle wheel by bolts or the like. This structure is provided with one bearing upon which the brake cylinder device is journaled and supported and also has a radial thrust bearing for engagement by the brake cylinder device to hold it against axial movement for counteracting the thrust thereof against the brake elements during braking.

Another object of the invention is to provide a novel, unit disk brake mechanism in which no thrust bearing is required; the various parts of the brake mechanism being so constructed and arranged that the brake elements themselves counteract the thrust of the brake cylinder device.

Other objects and advantages will appear in the following more detailed description of the invention.

In the accompanying drawings, Fig. 1 is a horizontal, sectional view of a railway vehicle wheel and of the novel brake mechanism applied to said wheel; Fig. 2 is an end view partly in elevation and partly in section of the novel brake mechanism; Figs. 3, 4 and 5 are sectional views taken, respectively, on the lines 3—3, 4—4 and 5—5 in Fig. 2; and Fig. 6 is a view at an enlarged scale of a portion of the structure shown in Fig. 1.

Description of parts

In the drawings the brake mechanism embodying the invention is shown associated with a wheel 1 of the type employed under railway vehicles, for the purpose of illustrating one application of the invention. Wheel 1 is provided with the usual flanged tread portion for engaging a rail 2 of a trackway and has at its center a hub 3 in which there is secured in any desired manner the usual axle 4. The novel brake mechanism is preferably secured to the outer face of the wheel 1, as will be later brought out in detail, in order to facilitate the application of the mechanism to the wheel and the removal of said mechanism from the wheel.

The novel brake mechanism comprises a sleeve 7 having at one end an outturned annular flange 8, said sleeve and flange constituting a combined bearing and support member for the various parts of the brake mechanism to be later described.

An annular ring-like disk member 9, having a greater outside diameter than that of the flange 8, is secured against the outer surface of the flange 8 preferably by welding. Mounted against the opposite face of flange 8 is an annular ring-like member 10 which comprises an inner, radially extending annular portion 5 for engaging said flange, an outer radially extending annular portion 11 and a central cylindrical portion 12 connecting said radial portions, said cylindrical portion being provided to space the radial portion 11, which is of the same outside diameter as that of member 9, a predetermined distance from said member, as shown in Fig. 1 of the drawings.

The ring-like member 10 is rigidly secured against the inner-face of the flange 8 in coaxial relation with the ring-like member 9 by a plurality of torque screws 13 extending through suitably aligned openings in the inner peripheral portions of said members and flange into the hub 3 of the wheel 1, whereby said members and the sleeve 7 are rigidly secured against the hub 3 in coaxial relation and for rotation with the wheel 1. The torque screws 13 are preferably equally spaced from each other around the flange 8, and between one or more adjacent pairs of said torque screws there is provided an assembling screw 14 which extends through the inner peripheral portion 5 of the ring-like member 10 and has screw-threaded engagement with the flange 8. The purpose of the assemblying screw or screws 14 will be hereinafter brought out.

Adjacent the outer periphery of the ring-like members 9 and 10 a plurality of torque bolts 15, disposed parallel to the axis of sleeve 7, extend between and through suitably aligned openings in said members. These bolts are preferably equally spaced from each other circumferentially of the ring-like members 9 and 10 and each of the bolts is provided with a head 16 bearing against the outer face of the ring-like member 9 and preferably rigidly secured thereto by welding. A nut 17 is provided on the opposite end of each of the bolts 15 and engages the radial portion 11 of the ring-like member 10.

Two, annular, ring-like rotatable brake elements or discs 18 and 19 encircling the sleeve 7 extend into the space between the ring-like members 9 and 10. The bolts 15 extend through suitable apertures provided in the brake elements 18 and 19, adjacent their inner peripheries, for supporting said elements in concentric relation with said sleeve and for turning same with the car wheel 1.

A release bolt 20 is provided parallel to and between each adjacent pair of torque bolts 15. Each of the release bolts 20 comprises a head 21 and a stem made up of cylindrical portions 22 and 23 of different diameters stepped down in the direction away from the head 21. The head 21 of each bolt 20 is provided for engagement with the outer face of the annular rotatable element 18, and through said element there is provided a suitable aperture for the cylindrical portion 22 of the bolt to operate, the cylindrical portion 23 of said bolt operating through suitable aligned apertures of smaller diameter provided through the rotatable brake element 19 and the flange 11 of the ring-like member 10. A spring seat 24 is mounted over the end of each of the release bolts 20 which projects beyond the outer face of the radial portion 11 of the ring-like member 10 and is held thereon by a nut 25, and interposed between said spring seat and the outer face of said ring-like member 10 is a release spring 26 which is preferably of coil form encircling the bolt.

Each of the release bolts 20 is provided with a shoulder 27 formed at the junction of the two cylindrical portions 22 and 23. The several springs 26 acting on the bolts 20 are provided for pulling the shoulder 27 on the bolts against the rotatable brake element 19 and for then urging said element into engagement with the radial portion 11 of the ring-like member 10 which defines the position assumed by said brake element when the brakes on the wheel 1 are released. The head 21 on each of the release bolts 20 is so spaced from the shoulder 27 as to engage and draw the rotatable brake element 18 to its release position with respect to the rotatable element 19 when in its release position.

A release spring 28 is provided on the cylindrical portion 22 of each of the bolts 20 and acts on the two brake elements 18 and 19 for holding the element 18 against the bolt heads 21 when the brakes are released. The disk-like element 9 is provided with suitable apertures 86 aligned with the release bolt heads 21 through which said heads are adapted to freely move in effecting an application of the brakes, which will be later described.

The two rotatable brake elements 18 and 19 are interleaved between three, annular non-rotatable brake elements or disks 29, 30 and 31, the element 29 being disposed closest to the wheel 1, the element 30 being disposed between the two rotatable brake elements 18 and 19, while the element 31 is disposed adjacent the outer face of the rotatable element 19. Each of the non-rotatable brake elements 29, 30 and 31 is of the same outside diameter as the rotatable brake elements 18 and 19 while the inside diameter of said non-rotatable elements is somewhat greater than the outside diameters of the ring-like members 9 and 10. Each of the non-rotatable brake elements 30 and 31 is provided with a pair of diametrically oppositely disposed lugs 88 projecting radially from the outer peripheral edge thereof and between said lugs and at both sides thereof there are provided a plurality of similar outstanding lugs 89, the lugs 88 and 89 being preferably equally spaced from each other around the outer peripheral surfaces of said elements. The lugs 88 are of greater circumferential length than the lugs 89 for reasons which will be later apparent. The non-rotatable brake element 29 is provided with a plurality of lugs 89 corresponding in number and disposition to the lugs 88 and 89 on the other two non-rotatable brake elements.

Encircling the sleeve 7 is a support ring 32 lined interiorly with a bearing ring 33 which is journaled on said sleeve. The bearing ring 33 is adapted to bear at its inner end against a shoulder 34 provided on the sleeve 7, while secured to said sleeve and bearing against the outer end of said ring is an annular member 35 secured to said sleeve by screws 36. The member 35 is provided to act when the brakes are released to hold the support ring 32 and parts of the brake mechanism carried thereby against axial movement relative to the sleeve 7 and to the parts of the brake mechanism carried by said sleeve which have been hereinbefore described.

A ring-like disk 37 encircles and is rigidly secured at its inner peripheral edge to the supporting ring 32 preferably by welding. The disk 37 is provided intermediate its edges with an outwardly extending annular offset providing in the inner face thereof an annular channel 90 to accommodate the release springs 26 and bolts 20 hereinbefore described. The outer periphery of said disk 37 is substantially the same diameter as that of the non-rotatable brake elements 29, 30 and 31, and is provided at one side with a radially extending lug 78 of such length as to span one of the lugs 88 and a lug 89 at either side thereof on the adjacent non-rotatable element 31. The disk 37 also has outstanding lugs 91 and 92 aligned with the other lugs 88 and 89, respectively on the non-rotatable brake element 31.

An annular ring-like brake cylinder device 38 is mounted against the outer face of the ring-like disk 37 in coaxial relation with the rotatable brake elements 18 and 19. The brake cylinder device 38 is provided around its circumference with a plurality of outstanding lugs 39 bearing against the disk 37 in alignment with the lugs on said disk and those on the non-rotatable brake elements. Each of the lugs 39 is provided with a screw-threaded bore, the several bores being aligned with apertures through the lugs 78, 91 and 92 on disk 37, and extending through each of these apertures and screw-threaded into the respective bores is a bolt 40 having a head 41 which bears against the opposite face of disk 37 for rigidly securing the brake cylinder device to the disk in coaxial relation with the rotatable brake elements 18 and 19.

Each of the bolts 40 is provided adjacent wheel 1 with an outstanding portion 42 extending parallel to the axis of the sleeve 7 and provided with three guide portions 43, 44 and 45 of different diameters stepped down in the direction of the car wheel. The guide portions 43 of greatest diameter on the several bolts extend through suitable apertures in the lugs projecting from the non-rotatable brake element 31 for supporting said element in coaxial relation with the rotatable brake element 19, while the guide portions 44 and 45 extend through suitable apertures in the lugs projecting from the non-rotatable brake elements 30 and 29, respectively, for supporting same also in said relation, the non-rotatable elements 30 and 31 being slidably mounted on the guide sections 44 and 43. The non-rotatable elements 30 and 31 are mounted on the bolts 40 in such a manner that the lugs 88 of the two brake elements are in alignment with each other and with one aligned pair mounted on the center of the three bolts extending through the lug 78 projecting from the disk 37.

The outstanding lugs 88 and 89 on the non-rotatable brake element 31 are adapted to engage the heads 41 of the bolts 40 for defining the release position of said element in which position it is spaced from the rotatable brake element 19 when in its release position hereinbefore described. A shoulder 46 formed at the junction of each two guide portions 43 and 44 on the several bolts 40 serves to limit movement of the non-rotatable element 30 in a direction away from the wheel 2 to thereby define its release position in which it is adapted to be spaced midway between the rotatable brake elements 18 and 19 when said rotatable brake elements are in their release position above described. A shoulder 47 formed at the junction of the guide portions 44 and 45 on each of the bolts 40 is adapted to be engaged by the non-rotatable brake element 29 for defining its release position with respect to the rotatable brake element 18 when in its release position. A nut 48 is provided on the end of the outstanding portion 42 of each of the bolts 40 and bears against the non-rotatable element 29 for at all times holding it against the shoulder 47 provided on the several bolts.

From the above description it will be evident that the ring-like disk 37 which is journaled on the sleeve 7 supports the brake cylinder device and the several non-rotatable brake elements through the medium of the bolts 40 in coaxial relation with the sleeve 7 and thereby with the wheel 1 and it will be evident that the rotatable brake elements 18 and 19 are adapted to be free to rotate between the several non-rotatable brake elements when all of said brake elements are in their release positions above described.

The middle of the three bolts 40 extending through the lug 78 on disk 37 and the diametrically opposite bolt 40 are each provided with a projecting portion 49 extending in a direction away from the wheel 1, and slidably mounted on each of these portions 49 is a combined spring seat and cross-head 50. A release spring 51 encircling the portion 49 of each of the two bolts 40 bears at its inner end against the brake cylinder lug 39 and at its outer end against the cross-head 50 urging said cross-head in a direction away from the brake cylinder device.

The cross-head 50 is provided with two oppositely disposed radially extending arms 52 to the outer end of each of which is secured one end of a release bolt 53, the two bolts 53 being disposed one above and one below the bolt 40 and extending parallel therewith. Each of the release bolts 53 extends through suitably aligned apertures in the aligned lugs 78 and 88 of the disk 37 and non-rotatable brake element 31 beyond which each of said bolts is provided with a portion 54 of larger diameter which extends through suitably aligned apertures in the aligned lugs 88 of the non-rotatable brake element 30.

Each of the rods 53 is provided at the outer end of the enlarged portion 54 with a head 55 for engagement with the lugs 88 of the non-rotatable element 30 for urging said element to its release position, while the inner end of the enlarged portion 54 functions in a like manner to engage and urge the non-rotatable element 31 to its release position. In the drawings, the non-rotatable elements 30 and 31 are shown in their release positions defined by engagement between the lugs 88 on said elements and, respectively, heads 41 on the bolts 40 and the shoulders 46 on said bolts, as hereinbefore described.

A nut 56 is provided on the end of each of the bolts 53 and engages the cross-head 50 whereby the length of said bolts and thereby the force of the release springs 51 may be adjusted to insure movement of the non-rotatable brake elements 30 and 31 to their release positions just described. It will be noted that only the non-rotatable elements 30 and 31 are connected to the release bolts 53 and are capable of axial movement, since the non-rotatable element 29 is secured against such movement between the shoulders 47 on the several bolts 40 and the nuts 48.

The brake cylinder device 38 comprises a casing provided with an annular, open-ended chamber 57 having a mean diameter substantially equal to that of the overlapping portions of the rotatable and non-rotatable brake elements, the open end of said chamber being substantially closed by the disk 37. A ring-like brake cylinder piston 59 is disposed to operate in the chamber 57, said piston comprising a piston head 60 provided on the pressure side with a flexible packing cup 61 between which and the piston head there are provided a pair of lubricating rings 62 engaging both the inner and outer walls of the piston chamber, said rings being made of any suitable lubricant absorbing and spreading material, such as felt.

The packing cup 61 is open at the face opposite the piston head 59 to a pressure chamber 63 which is connected to a pipe 64 through which fluid under pressure is adapted to be supplied to and released from said chamber for controlling the braking operation of said piston. At the opposite side of the piston head 59 there is provided a non-pressure chamber 65 which is open to the atmosphere in any desired manner such as through apertures 66 provided in the disk 37 and thence through the space between said disk and the adjacent non-rotatable brake element 31.

The brake cylinder piston 59 is provided with a plurality of piston pins 58 equally spaced from each other and freely extending through the apertures 66, which are suitably aligned, into engagement with the adjacent face of the non-rotatable element 31 at points substantially midway between the overlapping portions of the non-rotatable and rotatable brake elements. These pins are of such length as to provide for engagement between the non-rotatable element 31 and the several nuts 41 upon substantial engagement between the packing cup 61 and the closed end of chamber 57.

A flat insulating ring 67 is interposed in the space between the non-rotatable brake element 31 and the disk 37. The inside and outside diameters of this insulating ring are substantially the same as of the brake cylinder device and it is provided with a plurality of spaced apertures through which the piston pins 58 extend for supporting the ring. As most clearly shown in Fig. 6, each of the piston pins 58 is provided on the brake cylinder side of the insulating ring 67 with a shoulder 68 for engagement by the ring, while at the opposite side said ring is engaged by a snap ring 69 disposed in an annular groove provided adjacent the end of each piston pin. The insulating ring 67 is thus secured in a position in which it is spaced from both the non-rotatable brake element 31 and the disk 37 and is adapted to move with the piston pins 58, as will be evident.

The ring 67 is preferably provided on the face adjacent the non-rotatable brake element 31 with a highly polished surface adapted to reflect heat back toward said element and thus away from the brake cylinder piston 59. The ring is also made of a material such as copper or an alloy thereof which has the property of quickly giving up absorbed heat for reasons which will be later brought out.

The rotatable brake elements 18 and 19 are provided in both of their opposite braking faces with a plurality of radially arranged slots 72, the slots in one face of the elements being staggered with respect to those in the opposite face. These slots open through the outer peripheral edges of the rotatable brake elements directly to the atmosphere, while the inner ends of the slots in the rotatable brake element 18 and in the adjacent face of the rotatable brake element 19 open past the inner peripheral edges of the non-rotatable brake elements 29 and 30 to a chamber 73. This chamber is formed between the disk-like members 9 and 10 and is open to the atmosphere through a plurality of apertures 74 provided in the cylindrical portion 12 of member 10 and which open to a chamber 75 formed between the element 10 and disk 37, the chamber 75 being in turn open to the atmosphere through a plurality of apertures 76 in the disk 37. The radial slots 72 provided in the outer face of the rotatable brake element 19 are open at their inner ends to the chamber 75.

The apertures 76 are so arranged that upon rotary movement of the disk 37 relative to the sleeve 7 said apertures will line up with the torque screws 13 to permit said screws to be applied in or removed from the positions in which they are shown in the drawings.

A torque plate 79 is rigidly secured to the lug 78 projecting from disk 37 by a plurality of rivets 80. This plate is provided at its outer end with two bosses 81 which are spaced from each other and each of which is provided with a vertically arranged bore in axial alignment with a corresponding bore in the other. A torque arm 82 is provided having two spaced cylindrical guide portions 83 disposed between and substantially engaging the adjacent faces of the bosses 81 and having aligned bores provided in coaxial relation with those in the bosses 81. A vertically arranged torque pin 84 is provided which extends through the bosses 81 and the bores in the torque arm 82 thereby rigidly securing the disk element 37, brake cylinder device and the several non-rotatable brake elements against rotation relative to the torque arm 82. The torque arm 82 is rigidly connected to a bar 85 which is adapted to be connected, in any desired manner and to any suitable portion of the vehicle truck (not shown) for holding the torque arm 82, the pin 84 and thereby the disk 37, brake cylinder device and several non-rotatable elements against rotation with the car wheel 1.

*Assembling of the brake mechanism*

The brake mechanism, exclusive of the torque arm 82, is adapted to be assembled into a unit at a bench in a shop remote from the vehicle to which it is to be applied and then, when desired, applied as a unit to the wheel of the vehicle, following which the torque arm 85 may be connected to the vehicle truck and to the brake mechanism as shown in the drawings.

The assembling of the brake mechanism is accomplished in the following manner, the various parts hereinbefore described as being welded together being previously secured in their proper working relation.

The rotatable brake elements 18 and 19 with the non-rotatable brake element 30 interposed therebetween are first slipped over the torque bolts 15. Next the small release springs 28 are interposed between the rotatable brake elements and the release bolts 20 are slipped into place for holding said springs in position. Then the disk-like member 10 is applied over the outer ends of the bolts 15 following which the assembling screws 14 are applied to rigidly secure said member to the flange 8 of sleeve 7. The release springs 26, spring seats 24 and nuts 25 are next applied to the release bolts 20 and said nuts adjusted to provide the desired compression of said springs for insuring release movement of the rotatable brake elements 18 and 19.

The several bolts 40 are next inserted through the apertures in the lugs projecting from the support disk 37 and screwed into the lugs 39 projecting from the brake cylinder device securing said device to said disk. The brake cylinder piston 59, having mounted thereon the packing cup 61 and being provided with the piston pins 58, is mounted in place in the brake cylinder device before said device is secured to the disc 37, and at the time of securing, the piston pins 58 will be lined up for extending through the apertures 66 in said disk, as will be evident.

After the brake cylinder device is secured to the disk 37, the non-rotatable brake element 31 is slipped on to the guide sections 43 of the several bolts 40 following which this assembly of parts, including the disk-like member 37, is slipped on to the bearing on the sleeve 7, and during such movement the apertures in the lugs on the non-rotatable element 30 are lined up to receive the cylindrical guide portions 44 of the several bolts 40. After the disk-like member 37 is slipped onto the sleeve 37 to its working position, the non-rotatable brake element 29 is slipped over the guide sections 45 of the several bolts 40 and then the nuts 48 are applied to the ends of said bolts for securing the non-rotatable element 29 against the shoulders 47. The ring 35 is next slipped over the end of the sleeve 7 and secured in place by the screws 36.

The release springs 51 are next slipped over the extensions 49 of the bolts 40 following which the release rods 53 are threaded from outside of the non-rotatable brake element 30 through the apertures in the lugs thereof and through those in the lugs of the non-rotatable element 31. The cross-heads 50 are then slipped over the extensions 49 of bolts 40 against the pressure of springs 51 and the bolts 53 are threaded through the ends of said cross-heads. The nuts 56 are then applied to the ends of the bolts 53 and adjusted to provide the desired compression of springs 51 for insuring release movement of the non-rotatable brake elements 30 and 31.

All of the various parts of the brake mechanism except the torque arm 82 are now assembled into a unit in their proper working relation, and as such a unit said mechanism is adapted to be mounted on or removed from the wheel 1 of a vehicle.

In order to apply the brake mechanism to the wheel, said mechanism is mounted against the wheel hub 3 following which the torque bolts 13 are inserted through the apertures 76 in disk 37, and thence through the aligned apertures extending through the members 9 and 10 and flange 8 of the sleeve 7. A wrench (not shown) is then inserted through the apertures 76 and connected with the head of the torque screws 13 following which said screws are lined up and screwed into the openings provided in the end of the wheel hub 2, whereby the sleeve 7, members 9 and 10 and the rotatable brake element 18 and 19 are rigidly secured to the wheel for rotation therewith. After the brake mechanism is applied to the wheel, as just described, the assembling screws 14 serve no further useful purpose, the only purpose of these screws being to hold certain parts of the mechanism in an assembled condition prior to application to the car wheel. The assembling screws may however be left in place after the brake mechanism is applied to the wheel if such is desired.

After the brake mechanism is applied to the wheel 1 the torque bar 85 is connected to the disk 37 of said mechanism by the vertically arranged bolt 84 and suitably connected to any desired part of the vehicle truck for securing said disk and parts of the brake mechanism carried thereby against rotation with the wheel 1.

*Operation of the brake mechanism*

With a brake mechanism applied to the wheel 1 as above described, if it is desired to brake said wheel, fluid under pressure is supplied through the pipe 64 to the pressure chamber 63 wherein it acts on the brake cylinder piston 59 to effect movement thereof in the direction of said wheel.

As the brake cylinder piston 59 is thus operated it acts through the piston pins 58 to shift the non-rotatable brake element 31 along the guide portions 43 of bolts 40 into engagement with the rotatable brake element 19. Upon such engagement the rotatable brake element 19 is picked up and moved along the torque bolts 15 into engagement with the non-rotatable brake element 30 which is then picked up and moved along the guide portions 44 of the bolts 40 into contact with the rotatable brake element 18.

As the rotatable brake element 19 is moved along the torque bolts 15 as just described, it acts through shoulders 27 to carry the release bolts 20 along, due to which the springs 28 act to shift the rotatable brake element 18 in the direction of the non-rotatable brake element 29. As a result, the rotatable brake element 18 is moved into contact with the non-rotatable element 29 at about the same time that the rotatable element 19 engages the non-rotatable element 30, after which the continued movement of the rotatable element 19 to effect engagement between the non-rotatable element 30 and rotatable element 18 is relative to the rotatable element 18 and opposed by the springs 28 which are compressed. During this relative movement, the heads 21 of bolts 20 are free to move through apertures 86 in the disk member 9, as will be apparent.

After the several brake elements are thus moved into frictional interengagement the pressure of fluid acting on the brake cylinder piston 59 tends to force said elements in the direction of the wheel 1, while the reaction of the pressure of fluid acting on the brake cylinder piston is transmitted through the brake cylinder device to bolts 40 and thence to the non-rotatable brake element 29 tending to move same in the direction away from the wheel. The rotatable brake elements 18 and 19 and the non-rotatable brake elements 30 and 31 are thus subjected to the squeezing action of opposing pressures applied through the non-rotatable brake element 29 and the brake cylinder piston 59. As a result of this action the several non-rotatable brake elements create a drag on the rotatable brake elements 18 and 19 thereby effecting braking of said rotatable elements which is in turn transmitted through the disk-like members 9 and 10 and torque bolts 13 to the car wheel 1 for effecting braking of said wheel.

The degree with which the rotatable brake elements 18 and 19 and thereby the wheel 1 are braked, as just described, depends upon the pressure of fluid supplied to chamber 63 to act on the brake cylinder piston 59 and to react through the brake cylinder device 38 and bolts 40 on the non-rotatable brake element 29, and this pressure may be varied in any conventional manner to provide any desired degree of braking of wheel 1, as will be apparent.

As the several annular friction brake elements are moved into frictional interengagement as just described, it will be noted that the release springs 51 oppose such movement of the non-rotatable elements 30 and 31, and the release springs 26 oppose such movement of the rotatable brake elements 19 and 18, while movement of the rotatable element 19 to effect engagement between the non-rotatable brake element 30 and the rotatable brake element 18 is also opposed by the springs 22.

During braking it will be evident that the non-rotatable brake elements and the brake cylinder device are held against rotation with the rotatable brake elements due to the action of the torque rod 85.

When the several non-rotatable brake elements are forced into frictional braking engagement with the rotatable brake elements, all of the brake elements become heated due to this frictional contact. The slots 72 provided in the opposite faces of the rotatable brake elements act however during braking to draw air from chambers 73 and 75 and force same over the contacting surfaces of the several elements and through the outer ends of said slots to the atmosphere. This flow of air over the braking faces of the brake elements is provided for absorbing heat from said elements and dissipating it to the atmosphere so as to avoid excessive or destructive heating of the elements and to thereby maintain the temperature of the elements at a sufficiently low degree to provide efficient braking.

The polished surface of the insulating ring 67 is also effective at this time to reflect the heat radiated from the brake elements away from the brake cylinder device so as to protect the lubricant and the packing cup 61 in said device. When the wheel 1 is rolling along the rail 2 there will be a natural flow of air currents over the opposite faces of the insulating ring 67 and these air currents are adapted to carry heat away from the insulating ring so as to thereby further insulate the brake cylinder device and parts thereof from heat created in the brake elements during braking. Since the insulating ring is made from a material such as copper which has the properties of quickly absorbing and quickly giving up heat it will be evident that it will act as an effective barrier against the transfer of heat to the brake cylinder device, so that the brake cylinder device will be capable of operation over a long period of time.

When it is desired to effect a release of the brakes after an application, the fluid under pressure is vented from the brake cylinder piston chamber 63 through the brake cylinder pipe 64 thereby relieving the force on the brake cylinder piston 59 and the reacting force on the non-rotatable brake element 29. As a result, the release springs 51 acting through the rods 53 effect movement of said rods in the direction away from the wheel, while the release springs 26 acting on the release bolts 20 effect movement of said bolts in the same direction.

As the rods 53 are thus operated they act through the shoulders engaging the lugs projecting from the non-rotatable element 31 to move said element against the nuts 41, and through the heads 51 on the ends of said rods to move the non-rotatable element 30 into engagement with the shoulders 46 provided on the bolts 40, the nuts 41 and shoulders 46 defining the release positions of said elements as hereinbefore described.

As the release bolts 20 are returned to their release positions by springs 26 the shoulders 27 on said bolts return the rotatable brake element 19 into engagement with the disk-like member 10, and after a certain release movement of said bolts, the heads 21 thereof engage the rotatable brake element 18 and effect movement thereof to its release position, the springs 22 provided on said bolts between the rotatable brake elements ensuring that the rotatable brake element 18 will be maintained in contact with the heads 21 of the release bolts after this release operation. With the several brake elements moved to their release positions, as just described, the rotatable brake elements 18 and 19 are spaced from and therefore out of contact with the non-rotatable brake elements and thus free to rotate with the wheel 1.

It will be noted that the brake cylinder piston 59 is moved to its release position by movement of the non-rotatable brake element 31 to its release position. A brake cylinder piston of this type often has a relatively high resistance to movement, but the release movement of said piston and thereby of rotatable brake element 31 is ensured by the location of the release springs 51 outside or at one end of the pile of brake elements which provides for the use of relatively large springs, if necessary, to accomplish this end.

It will also be noted that the release springs 26 for effecting release movement of the rotatable brake elements 18 and 19 are disposed at the outer face of the element 19 so that their design is not confined to the space existing between the elements, as in conventional practice, but rather such springs may be of such size as required to ensure the proper release movement of the rotatable brake elements 18 and 19.

The only function of the springs 22 interposed between the rotatable brake elements 18 and 19 is to ensure that the rotatable element 18 will be held against the heads 21 on the release bolts 20 when the brakes are released so as to avoid axial movement of the rotatable element 18 into dragging contact with the non-rotatable brake element 30. The actual release movement of the rotatable elements 18 and 19 is effected wholly by the springs 26, independently of the springs 22, as will be evident from the above description.

The ring 35 engaging the bearing 33 acts when the brakes are released to hold the disk-like member 37 and thereby the non-rotatable brake elements 29, 30 and 31 against axial movement relative to the rotatable brake elements 18 and 19 so that when the brakes are released the non-rotatable brake elements will be held in their release positions above described out of contact with the rotatable brake elements 18 and 19, thereby avoiding, as will be evident, a dragging contact between said elements. When the brakes on the wheel 1 are applied as above described it will be evident that the ring 35 serves no useful purpose and it will be further evident that the disk member 37 which carries the brake cylinder device is not subject to any of the forces incident to braking. This disk 37 acts merely as a support for the non-rotatable brake elements and brake cylinder device when the brakes are applied, the same as when the brakes are released, since the force applied to the brake cylinder piston 59 and the reaction thereof are taken wholly by the disk brake elements.

*Summary*

From the above description it will be evident that the novel brake mechanism is relatively simple and compact in construction. Its design is such as to ensure positive and efficient operation of the various parts. The design also provides for most efficient fitting and assembling of parts since the mechanism can be assembled as a complete unit in railway shops or the like at a point remote from where it may be applied to the wheel of a vehicle. Not only the initial assembling of the mechanism but repairing thereof can thus be effected at locations providing adequate facilities and competent workmen. The application of such units to the wheels of vehicles can thus be effected by relatively unskilled workmen and by the simplest of tools. By this arrangement relatively long life and most efficient braking operation of the brake mechanism is ensured.

While one illustrative embodiment of the invention has been described in detail it is not the intention to limit its scope to that embodiment or otherwise than by the terms of the appended claims.

Having now described our invention, what we claim as new and desire to secure by Letters Patent, is:

1. A disk brake mechanism for a railway vehicle wheel comprising a pile of two annular rotatable friction brake elements secured to rotate with said wheel and an annular non-rotatable friction brake element interposed between said rotatable brake elements, actuating means operative to effect frictional interengagement between said rotatable and non-rotatable brake elements to effect braking of said wheel, release means operative upon release of said actuating means to effect disengagement of said elements from each other, the release means for said rotatable brake elements including at least one spring disposed beyond one end of said pile of elements, and means operatively connecting said spring to both of said rotatable brake elements.

2. A disk brake mechanism for a wheel of a railway vehicle comprising a pile of two annular rotatable friction brake elements secured to rotate with said wheel and an annular non-rotatable friction brake element interposed between said rotatable elements in coaxial relation therewith, actuating means operative to effect frictional braking interengagement between said elements, release means operative upon release of said actuating means for effecting disengagement of said elements from each other, the release means for said rotatable elements comprising at least one spring disposed beyond the outside face of one of said rotatable elements, and means operatively connecting said spring to both of said rotatable elements.

3. A disk brake mechanism for a wheel of a railway vehicle comprising a plurality of annular rotatable friction brake elements secured to rotate with said wheel, a plurality of annular non-rotatable friction braking elements interleaved with said rotatable elements, actuating means operative to move said elements axially into frictional interengagement to effect braking of said wheel, release means operative upon the release of said actuating means for effecting movement of said elements out of engagement with each other, the release means for said rotatable elements comprising at least one spring disposed beyond the outside face of one of the outer-most of said rotatable elements, and means operatively connecting said spring to all of said rotatable elements.

4. A disk brake mechanism for a wheel of a railway vehicle comprising a plurality of annular rotatable friction brake elements secured to rotate with said wheel, a plurality of annular non-rotatable friction braking elements interleaved with said rotatable elements, actuating means operative to move said elements axially into frictional interengagement to effect braking of said wheel, release means operative upon the release of said actuating means for effecting movement of said elements out of engagement with each other, the release means for said rotatable elements comprising at least one spring disposed beyond the outside face of one of the outer-most of said rotatable elements and operatively connected to all of said rotatable elements, and the release means for said non-rotatable elements comprising at least one spring disposed beyond the outside face of one of the outer-most of said non-rotatable brake elements, and operatively connected to all of said non-rotatable elements.

5. A disk brake mechanism for a railway vehicle wheel comprising a rigid structure secured to rotate with said wheel, a structure journaled on said rigid structure, a plurality of interleaved annular rotatable and non-rotatable friction brake elements having release positions spaced from each other and being movable axially into frictional interengagement to effect braking of said wheel, said rotatable elements being secured to said rigid structure for rotation with said wheel, the journaled structure extending past the outer face of one of the outer-most of said rotatable elements and carrying said non-rotatable elements, and release means for effecting movement of said brake elements out of interengagement to said release positions, the release means for said rotatable elements including spring means disposed between said journaled structure and the adjacent rotatable element and operatively connected to both of said rotatable elements, and the release means for said non-rotatable elements including spring means carried by said journaled structure beyond the outer face of one of the outer-most of the non-rotatable brake elements and operatively connected to said non-rotatable elements.

6. A disk brake mechanism for a wheel of a railway vehicle truck comprising a rigid structure secured to rotate with said wheel, a pair of annular rotatable friction brake elements encircling and carried by said structure and capable of axial movement relative thereto, said elements having brake release positions with respect to said structure, the release position of one of said elements being defined by engagement thereof with said structure, release means for said rotatable elements movable with one of said rotatable elements and relative to the other rotatable elements in one direction and operative upon movement in the opposite direction to effect movement of said elements to brake release positions in which they are spaced apart a predetermined distance, spring means for actuating said release means, resilient means acting on said other rotatable element for holding same against movement out of its release position relative to said release means, a pair of annular non-rotatable friction brake elements one disposed between said rotatable brake elements and the other disposed adjacent the opposite face of one of said rotatable brake elements, actuating means for effecting movement of said rotatable brake elements and of the non-rotatable brake element interposed between in the direction of the other non-rotatable brake element for effecting frictional interengagement between said elements to brake said wheel, said spring means opposing movement of said rotatable brake elements into interengagement with said non-rotatable elements and being operative upon the release of said actuating means to effect movement of said rotatable elements to said release positions, and spring means acting on the non-rotatable element disposed between said rotatable elements to effect movement thereof to a release position midway between said rotatable elements.

7. A disk brake mechanism for a railway vehicle wheel comprising a rigid structure secured to rotate with said wheel, a structure journaled on said rigid structure, a plurality of interleaved annular rotatable and non-rotatable friction brake elements having release positions spaced from each other and being movable axially into frictional interengagement to effect braking of said wheel, said rotatable elements being secured to said rigid structure for rotation with said wheel, the journaled structure extending past the outer face of one of the outer-most of said rotatable elements and carrying said non-rotatable elements, and release means for effecting movement of said brake elements out of interengagement to said release positions, the release means for said rotatable elements including spring means disposed between said journaled structure and the adjacent rotatable element and operatively connected to both of said rotatable elements, and the release means for said non-rotatable elements including spring means carried by said journaled structure beyond the outer face of one of the outer-most of the non-rotatable brake elements and operatively connected to said non-rotatable elements, both of said spring means being disposed beyond the outer face of the outer-most of the respective brake elements to which they are connected.

8. A disk brake mechanism for a wheel of a railway vehicle truck comprising a rigid structure secured to rotate with said wheel, a pair of annular rotatable friction brake elements encircling and carried by said structure and capable of axial movement relative thereto, said elements having brake release positions with respect to said structure, the release position of one of said elements being defined by engagement thereof with said structure, a plurality of release bolts carried by said structure and provided with shoulders for engaging said one rotatable element for effecting movement thereof against said structure, each of said bolts having another shoulder spaced from the first named shoulder and arranged to engage the other of said rotatable elements for effecting movement thereof to its release position, spring means disposed beyond the outside face of one of said rotatable elements and acting on each of said release bolts for operating same to move said brake elements to their release positions, a pair of annular non-rotatable friction brake elements one disposed between said rotatable brake elements and the other disposed adjacent the outside face of one of said rotatable brake elements, means for effecting movement of said rotatable brake elements and of the non-rotatable brake element interposed between in the direction of the other non-rotatable brake element for effecting frictional interengagement between said elements to brake said wheel, said spring means being operative upon the release of said actuating means for returning said rotatable brake elements to their release positions, and means acting on the non-rotatable brake element disposed between said two rotatable brake elements for centralizing same between said two rotatable brake elements.

9. A disk brake mechanism for a wheel of a railway vehicle comprising a rigid structure secured to rotate with said wheel, a plurality of axially movable, annular rotatable friction brake elements secured to said structure for rotation with said wheel, a plurality of annular non-rotatable friction brake elements interleaved with said rotatable friction brake elements, actuating means journaled on and carried by said rigid structure for actuating said non-rotatable and rotatable brake elements into frictional interengagement for effecting braking of said wheel, spring means carried by said rigid structure beyond the outer face of one of the outer-most rotatable brake elements operative on said rotatable elements to effect movement thereof out of engagement with said non-rotatable elements upon release of said actuating means, and spring means carried by said actuating means beyond the outside face of one of the outer-most of the non-rotatable elements operative on said non-rotatable elements to effect movement thereof out of engagement with said rotatable elements upon release of said actuating means.

10. A disk brake mechanism for a wheel of a railway vehicle comprising a rigid structure secured to rotate with said wheel, an annular rotatable friction brake element secured to said structure for rotation with said wheel, an annular non-rotatable friction brake element disposed at each of the opposite sides of said rotatable brake element in coaxial relation therewith, a structure journaled on said rigid structure and secured against rotation and supporting said non-rotatable elements, a brake cylinder device associated with the last named structure comprising a casing, a brake cylinder piston in said casing operatively connected to one of said non-rotatable elements, and means connecting said casing to the other of said non-rotatable elements cooperative with said piston upon operation thereof to effect frictional interengagement between said elements for braking said wheel.

11. A disk brake mechanism for a wheel of a railway vehicle comprising a rigid structure secured to rotate with said wheel, an annular rotatable friction brake element secured to said structure for rotation with said wheel, an annular non-rotatable friction brake element disposed at each of the opposite sides of said rotatable brake element in coaxial relation therewith, a member journaled on and supported by said rigid structure and secured against rotation, an annular ring-like brake cylinder device comprising a casing and a fluid operative piston therein operatively connected to one of said non-rotatable elements, and means securing said casing to said member and to the other of said non-rotatable elements whereby said casing is cooperative with said piston to effect frictional braking interengagement between said elements upon operation of said piston.

12. A disk brake mechanism for a wheel of a railway vehicle comprising a rigid structure secured to rotate with said wheel, a plurality of annular rotatable and axially movable friction brake elements secured to said structure for rotation therewith, a plurality of annular non-rotatable friction brake elements interleaved with said rotatable elements, each of said rotatable and non-rotatable brake elements having a release position disengaged from the brake elements at either side thereof, a structure journaled on and carried by said rigid structure and secured against rotation and carrying said non-rotatable elements, brake cylinder means carried by the journaled structure operative to actuate said rotatable and non-rotatable braking elements into frictional interengagement to effect braking of said wheel, a plurality of springs carried by said rigid structure beyond the outer face of one of the outer-most of the rotatable brake elements operatively connected to said rotatable brake elements for effecting movement thereof to their release positions upon release of said brake cylinder means, and spring means carried by said journaled structure beyond the outer face of one of the outer-most of the non-rotatable elements and operatively connected to said non-rotatable elements for effecting movement thereof to their release positions upon release of said brake cylinder means.

13. A disk brake mechanism for a wheel of a railway vehicle comprising a rigid structure secured to rotate with said wheel, an annular rotatable friction brake element secured to said structure for rotation with said wheel, an annular non-rotatable friction brake element disposed adjacent each of the opposite faces of said rotatable brake element, said non-rotatable elements having release positions spaced from said faces, a structure journaled on said rigid structure supporting said non-rotatable elements in coaxial relation with said rotatable element, actuating means carried by the journaled structure and connected directly to both of said non-rotatable elements for applying forces thereto in the direction of said rotatable element for effecting frictional braking interengagement of said elements to brake said wheel, means operative upon the release of said actuating means to position said non-rotatable brake elements in their release positions, and means securing said journaled means against axial movement relative to said rigid structure for maintaining said non-rotatable elements disengaged from said rotatable element when said non-rotatable brake elements are in their release positions.

14. A disk brake mechanism for a wheel of a railway vehicle comprising a rigid structure secured to rotate with said wheel, a pair of annular rotatable friction brake elements encircling said structure, means carried by said structure securing said elements for rotation therewith, and three annular non-rotatable friction brake elements arranged in coaxial relation with said rotatable elements with one of said non-rotatable elements interposed between said rotatable elements and each of the other non-rotatable elements disposed adjacent one of the outer faces of said rotatable elements, a structure journaled on and carried by said rigid structure, a plurality of rigid support members spaced from each other around the outer peripheral edges of said rotatable elements supporting said non-rotatable elements, a brake cylinder device secured to and carried by said support members and operatively connected to one of the outer-most non-rotatable elements, means securing the other outer-most non-rotatable element against movement relative to said support members, said brake cylinder device being operative through the one non-rotatable element and said means for effecting frictional braking interengagement between said non-rotatable elements and said rotatable elements, and spring means acting on said rotatable elements and on said non-rotatable elements operative upon the release of said actuating means for effecting disengagement of said elements from each other.

15. A disk brake mechanism for a wheel of a railway vehicle comprising a rigid structure secured to rotate with said wheel, an annular rotatable friction brake element secured to rotate with said structure, a disk-like member journaled on and carried by said rigid structure and secured against rotation, an annular non-rotatable friction brake element interposed between said rotatable brake element and the adjacent face of said member and carried by said member in coaxial relation with said rotatable element, and an annular brake cylinder device mounted on the opposite face of said member in coaxial relation with said brake element, said brake cylinder device comprising a casing secured to said member and having an annular chamber open at the end adjacent said member, said member closing the open end of said chamber, a brake cylinder piston mounted in said chamber, and a plurality of actuating pins extending through apertures in said member operatively connecting said piston to said non-rotatable element for effecting movement of said non-rotatable element into frictional interengagement with said rotatable brake element for braking said wheel.

JOSEPH C. McCUNE.
GEORGE K. NEWELL.